B. HARRINGTON.
Baking-Dish.

No. 128,725.　　　　　　　　Patented July 9, 1872.

WITNESSES　　　　　　　　INVENTOR

No. 128,725

UNITED STATES PATENT OFFICE.

BARZILLA HARRINGTON, OF CHINA, MAINE, ASSIGNOR OF ONE-HALF OF HIS RIGHT TO GREENLEAF W. STACKPOLE, OF BOSTON, MASSACHUSETTS.

IMPROVEMENT IN BAKING-DISHES.

Specification forming part of Letters Patent No. 128,725, dated July 9, 1872.

*To all whom it may concern:*

I, BARZILLA HARRINGTON, of China, in the county of Kennebec, State of Maine, have invented a certain new and useful Baking-Dish, of which the following is a specification:

*The Nature and Object of the Invention.*

The nature of my invention consists in constructing a baking-dish having the advantages of the ordinary metallic ones in respect to non-liability to breakage, and embracing in an enhanced degree the heat resisting and retaining power of the earthen dish; the object being to make a dish that is clean, durable, and of such a material that, though put into a very hot stove-oven, the heat will be imparted to the contents of the dish in a gradual manner, and be retained by the same a long while even after the supply of heat is withdrawn.

*General Description.*

Figure 1:
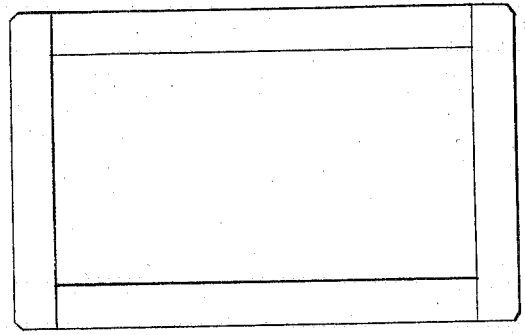
Figure 1 is a plan of my dish.
Figure 2:
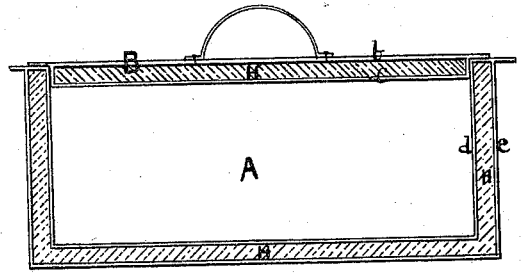
Fig. 2 is a vertical section of the same.

My dish may be constructed of any shape and size. The inner and outer walls *d e* are to be made of any suitable metal and fastened by rivets or closed joints. The interior between these walls is to be filled with gypsum, clay, or any suitable non-conducting material. The cover B is constructed in the same manner as the dish itself, *c* and *b* being of metal and the filling H of gypsum or clay.

This baking-dish has a great advantage over others, as it will not allow the heat of the oven to come in contact with the contents, except gradually, and when the contents once become heated they will remain so a long time; thus the baking will be gradual. This dish will not lose its non-conducting power by use, as in case of the ordinary earthen dish. An earthen dish, after being used a few times, becomes saturated and loses its non-conducting power; again, as earthenware is porous, it cools rapidly by evaporation. My dish cannot become saturated; hence its efficiency.

I claim as my invention—

A baking-dish, consisting of metallic double walls, filled in with gypsum, clay, or some similar non-conducting material, substantially as described, and for the purpose set forth.

BARZILLA HARRINGTON.

Witnesses:
H. FLOYD FAULKNER,
FRANK G. PARKER.